United States Patent
Houri (10) Patent No.: US 9,881,378 B2
(45) Date of Patent: Jan. 30, 2018

(54) POSITION DETERMINING TECHNIQUES USING IMAGE ANALYSIS OF MARKS WITH ENCODED OR ASSOCIATED POSITION DATA

(71) Applicant: Cyril Houri, Miami Beach, FL (US)

(72) Inventor: Cyril Houri, Miami Beach, FL (US)

(73) Assignee: Vortex Intellectual Property Holding LLC, Miami Beach, FL (US)

( * ) Notice: Subject to any disclaimer, the term of this patent is extended or adjusted under 35 U.S.C. 154(b) by 42 days.

(21) Appl. No.: 15/042,254

(22) Filed: Feb. 12, 2016

(65) Prior Publication Data

US 2017/0236285 A1 Aug. 17, 2017

(51) Int. Cl.
| | |
|---|---|
| G06K 9/36 | (2006.01) |
| G06T 7/00 | (2017.01) |
| G06K 9/00 | (2006.01) |
| G06K 9/22 | (2006.01) |

(52) U.S. Cl.
CPC ........ *G06T 7/0044* (2013.01); *G06K 9/00671* (2013.01); *G06K 9/22* (2013.01); *G06T 2207/30204* (2013.01); *G06T 2207/30244* (2013.01)

(58) Field of Classification Search
USPC ........ 382/233, 232, 190, 103; 235/380, 382, 235/435; 340/995.16; 353/15, 69, 70; 369/103; 701/455
See application file for complete search history.

(56) References Cited

U.S. PATENT DOCUMENTS

| | | | |
|---|---|---|---|
| 7,397,424 B2 | 7/2008 | Houri | |
| 7,696,923 B2 | 4/2010 | Houri | |
| 7,818,125 B2 * | 10/2010 | Hatano | ................ G01C 21/367 340/995.16 |
| 7,933,187 B2 * | 4/2011 | Kim | ..................... G11B 7/0065 369/103 |
| 8,195,126 B1 | 6/2012 | Houri | |
| 8,565,788 B2 | 10/2013 | Houri | |
| 8,668,144 B2 * | 3/2014 | Evevsky | ................. G06F 21/31 235/380 |
| 8,670,381 B1 | 3/2014 | Houri | |
| 9,010,942 B2 * | 4/2015 | Ueno | .................. G03B 21/142 353/15 |
| 9,226,224 B1 | 12/2015 | Houri et al. | |

(Continued)

OTHER PUBLICATIONS

A. LaMarca et al., Place Lab: Device Positioning using Radio Beacons in the Wild, Pervasive 2005, Munich, Germany.

(Continued)

*Primary Examiner* — Anh H Do
(74) *Attorney, Agent, or Firm* — Brian Roffe (57) ABSTRACT

Method for determining position of a mobile device having an imaging device includes obtaining an image of a mark on a known-position object from the imaging device, the mark having an encoded position, decoding the mark to derive data about the position of the mark using a database of marks and their positions, and analyzing appearance of the mark in the image in combination with the derived data about the position of the mark to derive the position of the mobile device. Mark appearance analysis may involve analyzing an angle between an imaging direction of the imaging device and a surface of the mark.

23 Claims, 7 Drawing Sheets

(56) References Cited

U.S. PATENT DOCUMENTS

2008/0274752 A1    11/2008  Houri
2014/0119661 A1*   5/2014   Negro ................ G06K 7/10722
                                                        382/190
2014/0342756 A1    11/2014  Houri

OTHER PUBLICATIONS

Bill N. Schilit et al., Challenge: Ubiquitous Location-Aware Computing and the "Place Lab" Initiative, Proceedings of the First ACM International Workshop on Wireless Mobil, Sep. 2003.
Yatin Chawathe et al., A Case Study in Building Layered DHT Applications, Jan. 2005.
Yu-Chung Cheng et al., Accuracy Characterization for Metropolitan-scale Wi-Fi Localization, Proceedings of Mobisys 2005, Jan. 2005.
Ian Smith et al., Social Disclosure of Place: From Location Technology to Communication Practices, Pervasive 2005, Munich, Germany.
Jason I. Hong et al., Privacy and Security in the Location-enhanced World Wide Web, Proceedings of Ubicomp 2003, Seattle, WA, Oct. 2003.

* cited by examiner

POSITION DETERMINING TECHNIQUES USING IMAGE ANALYSIS OF MARKS WITH ENCODED OR ASSOCIATED POSITION DATA

FIELD OF THE INVENTION

The present invention relates generally to methods and arrangements to determine the position of an imaging device using image analysis and marks with associated position data, optionally encoded into the marks themselves. The present invention also relates to methods and arrangements to guide a person or automated vehicle to a destination by presenting them with a map or commands, and methods and arrangements to select information to display to a person based on their position.

BACKGROUND OF THE INVENTION

It is common for a smartphone user to seek their position and use their position to be guided to a target location. It is also common for a smartphone to display information to a user based on their position.

OBJECTS AND SUMMARY OF THE INVENTION

It is an object of the present invention to provide a new technique to determine the position of an imaging device using image analysis and marks with associated position data that may be encoded into the marks themselves.

In order to achieve this object and others, a method for determining position of a mobile device having an imaging device in accordance with the invention includes obtaining an image of a mark on a known-position object from the imaging device, the mark having an encoded position, decoding the mark, using a processor, to derive data about the position of the mark, and analyzing appearance of the mark in the image in combination with the derived data about the position of the mark, using the processor, to derive the position of the mobile device. The mark may be a two-dimensional mark. The known-position object may be an object fixed in position.

The analyzing step may be performed at a remote site separate and apart from the mobile device or on the mobile device. In one embodiment, the analyzing step entails analyzing an angle between an imaging direction of the imaging device and a surface of the mark using the processor.

The decoding step may be performed at a remote site separate and apart from the mobile device or alternatively, on the mobile device, or as another alternative, partly on the mobile device and partly at the site remote from the mobile device. Generally, decoding involves accessing a database resident on at least one memory component and containing data about a plurality of marks and the position of each mark. If performed at a remote site, decoding may involve wirelessly transmitting the mark to a site remote from the imaging device. A database resident on at least one memory component and containing data about a plurality of marks and the position of each mark is accessible at the remote site to output the position of the mark wirelessly transmitted from the imaging device. The data about the position of the mark output from the database is received at the mobile device from the remote site via communicating devices using communication protocols.

A method for destination guiding using an imaging device in accordance with the invention includes, in addition to the basic position determining steps mentioned above, determining a target location in response to receiving user input by means of a user interface coupled to the mobile device, determining a route between the position of the imaging device and the target location, and conveying the route to the user, e.g., by marking the route on a map and displaying the map with the marked route on a display viewable by the user. The target location may be a retail establishment, an entertainment venue, a residence or a business.

A method for selecting information for presentation on a mobile device including an imaging device in accordance with the invention includes, in addition to the basic position determining steps mentioned above, determining information to present, from among a plurality of different available information items, based on the position of the imaging device, which may be considered the position of the mobile device, and presenting the information using an output device of the mobile device.

A method implemented at a server to provide position data about mobile devices in accordance with the invention includes maintaining a database resident on at least one memory component accessible to the server and containing data about a plurality of marks and the position of each mark, and wirelessly receiving at the server from a mobile device, an image of a mark obtained from an imaging device of the mobile device using a communications device at the server. Then the database is accessed, using a processor at the server, to obtain the position of the mark as output from the database upon inputting the mark in the received image, and the appearance of the mark in the received image is analyzed, using the processor, in combination with the position of the mark output from the database to derive the position of the mobile device. A transmission to the mobile device is generated at the server to cause a positional information providing system on the mobile device, e.g., a display providing information in a visual form, a speaker providing information in a vocal form, to change data about position of the mobile device being provided by the positional information providing system. The mark may, but is not required to, have encoded position data. The mark may be an optically recognizable three-dimensional structure.

Although not required, the position of the imaging device, which may be considered the position of the mobile device, may be transmitted from the server to the mobile device. Alternatively, a route or information selected based on the position of the imaging device may be transmitted from the server to the mobile device.

For example, when the positional information providing system is a display of the mobile device, the server may be configured to receive a target location from the mobile device, and determine a route between the position of the mobile device and the received target location. In this case, the transmission includes the determined route to enable the determined route to be marked on a map displayed on the display of the mobile device. Marking a displayed map with a route and directions may be by any known technique. Additionally or alternatively, information to present from among different available information items may be determined based on the position of the imaging device, which may be considered the position of the mobile device, in which case, the transmission includes the determined information to enable the determined information to be displayed on the display of the mobile device, or otherwise conveyed to the user, e.g., verbalized via the speaker.

BRIEF DESCRIPTION OF THE DRAWINGS

The invention, together with further pattern of pixels and advantages thereof, may best be understood by reference to the following description taken in conjunction with the accompanying drawings, wherein like reference numerals identify like elements, and wherein.

DETAILED DESCRIPTION OF THE INVENTION

Figure 1:
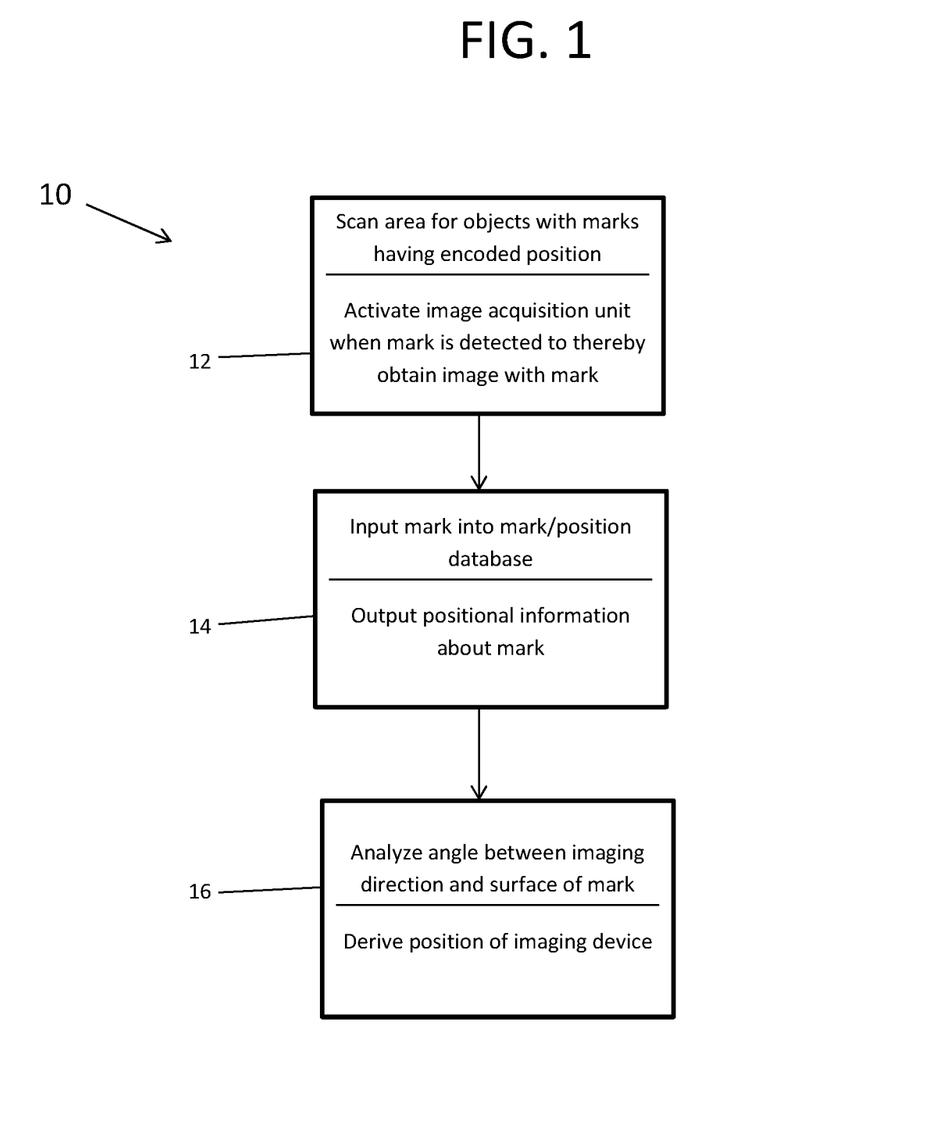
FIG. 1 is a flowchart of a basic method in accordance with the invention for determining position of an imaging device using a mark with encoded position data.

Referring to the accompanying drawings wherein like reference numbers refer to the same or similar elements, FIG. 1 is a flowchart of a basic method 10 in accordance with the invention for determining position of an imaging device. The imaging device may be a camera or any other device capable of forming an image of objects in its field of view, which image can be typically converted into signals representative of the objects for processing by a processing unit. The imaging device may be situated on any number of different types of devices including, but not limited to, mobile devices such as smartphones, vehicles such as automated guided vehicles (AGVs), drones and other devices that move and require their position to obtain the desired movement. There is no limitation on the type of device on which the imaging device is arranged, housed, mounted, fixed, attached, etc., or the type of device into which the imaging device is integrated or incorporated.

The basic method 10 involves as a first step 12, obtaining an image of a mark on a known-position object from the imaging device. The object may be fixed in position and immovable, e.g., a mark on a building or infrastructure, or fixed to an object that can move but is stationary at the time the image is obtained.

Figure 7A:
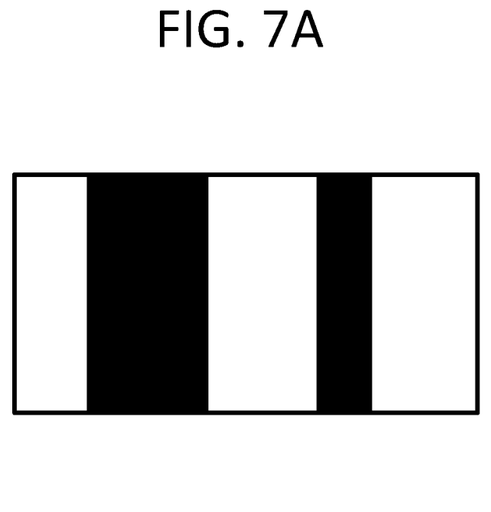
FIG. 7A is a view of a two-dimensional mark that could be used in the invention taken from a position directly in front of the mark.

The mark is preferably two-dimensional and has an encoded position, typically the position of the object on which the mark is situated. The manner in which information can be encoded into a two-dimensional mark is known to those skilled in the art and any such encoding techniques may be used. Various two-dimensional marks that can be encoded with information are also known, e.g., bar codes, QR codes and the like. The pattern of white and dark areas conveys the information (see FIG. 7A showing a pattern of black and white areas). Thus, one skilled in the art would be able to make and use a mark with encoded position in view of their knowledge and the disclosure herein. For example, it is possible to print or paint a mark on a surface of an object, the surface of the mark thus being the surface of the object.

The position being encoded in the mark may be in the form of longitude and latitude coordinates, or any other positional coordinates. When the object is permanently fixed in position, the position encoded into the mark does not change. However, when the mark is fixed to an object that can move but is stationary at the time the image is obtained, the position encoded into the mark can change as a function of the position of the object. Designing an encoding algorithm that assigns different patterns of lines or shapes of marks to different positions of the marks is within the purview of one skilled in the encoding field.

The imaging device may be configured to repeatedly analyze objects in its field of view for the presence of specific two-dimensional marks that have encoded position information, e.g., to scan the environment in its field of view around the imaging device. Whenever such a mark on an object is determined to be present in its field of view, the imaging device would activate an image acquisition unit and obtain an image containing the mark on the object.

After each image containing a mark with encoded position is obtained in step 12, the image is processed in step 14 to derive data about the position of the mark. That is, the mark is decoded to determine the encoded position of the mark. This data is typically positional coordinates of the mark.

There are several ways to decode the mark. Most often, the mark is input into a database resident on at least one memory component and containing data about a plurality of marks and the position of each mark. The output from the database is the position of the mark identical to, or deemed the most similar to, the input mark.

A computer program resident in non-transitory computer-readable media may be executed by a processor to access the database, providing the database with the mark or signals representative of the mark, and directing the database to compare the mark or signals to stored marks or signals in the database and then when a comparison is made, output positional data associated with the mark. This processor may be resident in the same housing as the mobile device, or on or in the mobile device, e.g., in a smartphone.

Decoding of the mark may alternatively, or additionally, be performed at a site remote from the imaging device, and separate and apart from any housing on which the imaging device is located. That is, the imaging device would only obtain an image containing a mark, and then the mark or signals representative thereof is wirelessly transmitted by a communications unit associated with the imaging device, e.g., in the same smartphone, to a server at the remote site. This server at the remote site contains the computer program resident in non-transitory computer-readable media that accesses a database, again which is not necessarily housed in the same housing as the imaging device and separate and apart therefrom, and obtains the position of the mark from the database. The server then wirelessly transmits the position of the mark back to the unit including the imaging device, e.g., the smartphone. A server-implemented method is described below with reference to FIG. 6.

It is not essential how and where the position of the mark is determined. Rather, the invention contemplates that the decoding of the mark to determine its position may be performed using a processor and database on the same unit as the imaging device, e.g., in a smartphone or on an AGV, using a processor and database at a server remote from the imaging device, or a combination of these techniques which may be used when needed, e.g., when the position of the mark is not found by a processor accessing a database on the same unit as the imaging device and reference to a larger database of marks and position data, such as likely found at one or more remote sites, is needed to obtain the position of the mark.

Once the mark is decoded and the position of the mark is obtained, the next step 16 is to analyze appearance of the mark in the image in combination with the derived data about the position of the mark to derive the position of the imaging device. The position of the imaging device may correlate to the position of the unit in which the imaging device is housed or connected to. Thus, the position of the imaging device in a smartphone will be considered the position of the smartphone. Similarly, the position of the imaging device in an AGV will generally be considered the position of the AGV.

Figure 7B:
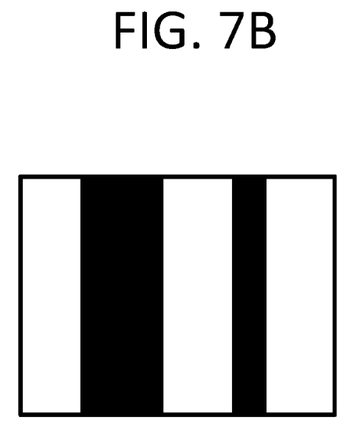
FIG. 7B is a view of a two-dimensional mark that could be used in the invention taken by an imaging device from an unknown position and which position is sought to be determined.

Analysis of the appearance of the mark entails, in a preferred embodiment, analyzing an angle between an imaging direction of the imaging device and a surface of the mark, which is, for example, the surface of the object on which the mark is printed. For example, a computer program resident in non-transitory computer-readable media may be executed by a processor to compare what the mark should look like when viewed directly in front of it, i.e., an imaging direction of 90 degrees (see FIG. 7A), and what the mark actually looks like in the obtained image (see FIG. 7B), and then determine the actual angle between the imaging direction of the imaging device and the surface of the mark. Note that FIG. 7B shows the same order of black and white areas as the mark in FIG. 7A but narrower, this narrowing results from the mark being viewed at a non-perpendicular angle to the surface of the object on which the mark is situated. This processor may be resident in the same housing as the mobile device, or on or in the mobile device, e.g., in a smartphone. Alternatively, the processor may be resident at the remote site, in which case, the remote site performs all of the processing and upon receiving an image or signals representative of the image from an imaging device of a mobile device, the processor returns the actual position of the imaging device and mobile device.

Figure 2A:
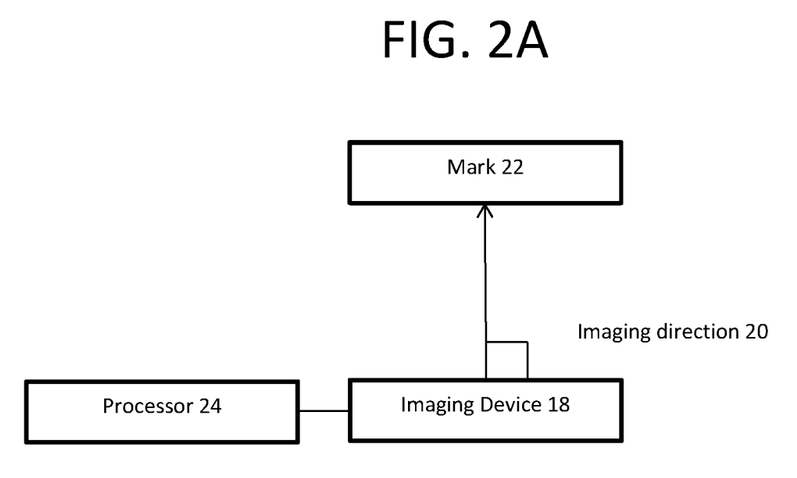
FIG. 2A is a view illustrating the manner in which the angle between an imaging direction of the imaging device and the surface of the mark affects the determination of the position of the imaging device.
Figure 2B:
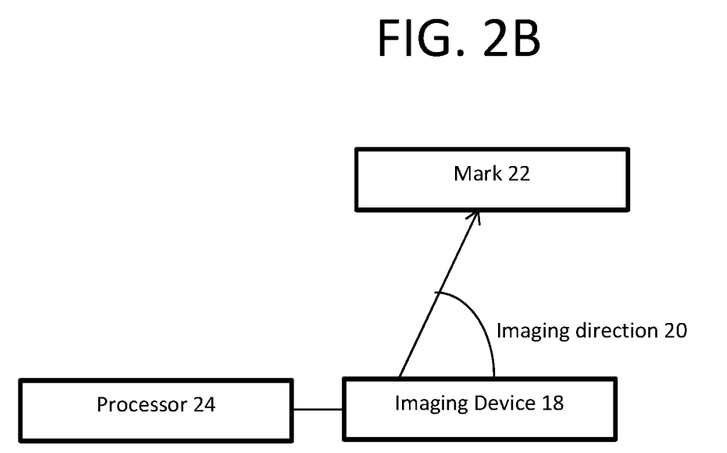
FIG. 2B is another view illustrating the manner in which the angle between an imaging direction of the imaging device and the surface of the mark affects the determination of the position of the imaging device.

As depicted in FIGS. 2A and 2B, the position of an imaging device 18 is different when the angle between the imaging direction 20 of the imaging device 18 and the surface of the mark 22 is different. In FIG. 2A, the angle between the imaging direction 20 of the imaging device 18 and the surface of the mark 22 is about 90 degrees, so the position of the imaging device 18 will be considered to be, say, 10 meters away from the position of the mark 22 in a direct perpendicular line from the surface of the mark 22. Thus, if the image of the mark in FIG. 7A is obtained by the imaging device, and it is known that the image of the mark in FIG. 7A was taken from a position 10 meters directly in front of the mark, then the processor will determine the position of the imaging device as being 10 meters from the known position of the mark in the direction perpendicularly outward from the surface of the mark.

On the other hand, in FIG. 2B, the angle between the imaging direction 20 of the imaging device 18 and the surface of the mark 22 is about 60 degrees, so even though the imaging device may be 10 meters from the mark 22, because of the non-perpendicular angle between the imaging direction 22 and the surface of the mark 18, the position of the imaging device 18 will be considered to be 8 meters away from the position of the mark 22 in a direction perpendicular to the surface of the mark 22 and 6 meters to the side of the mark 22. A processor 24 can perform the calculations to determine the position of the imaging device 18 once the angle between the imaging direction 20 of the imaging device 18 and the surface of the mark 22, and the position of the mark 22 are known. As mentioned above, this angle may be determined by comparing what the mark 22 should look like when the imaging direction 18 is 90 degrees, and what the mark 22 actually looks like in the obtained image (comparing FIG. 7B to FIG. 7A).

Thus, it must be understood that the same mark 22 will appear differently in images obtained by the imaging device 18 dependent on the angle between the imaging direction 20 and the surface on which the mark 22 is printed, as well as dependent on the distance between the imaging device 18 and the mark 22. Both of these aspects are considered by the processor 24 when determining the position of the imaging device 18 based on the known position of the mark 22 and analysis of the appearance of the mark 22 in the image.

Figure 3:
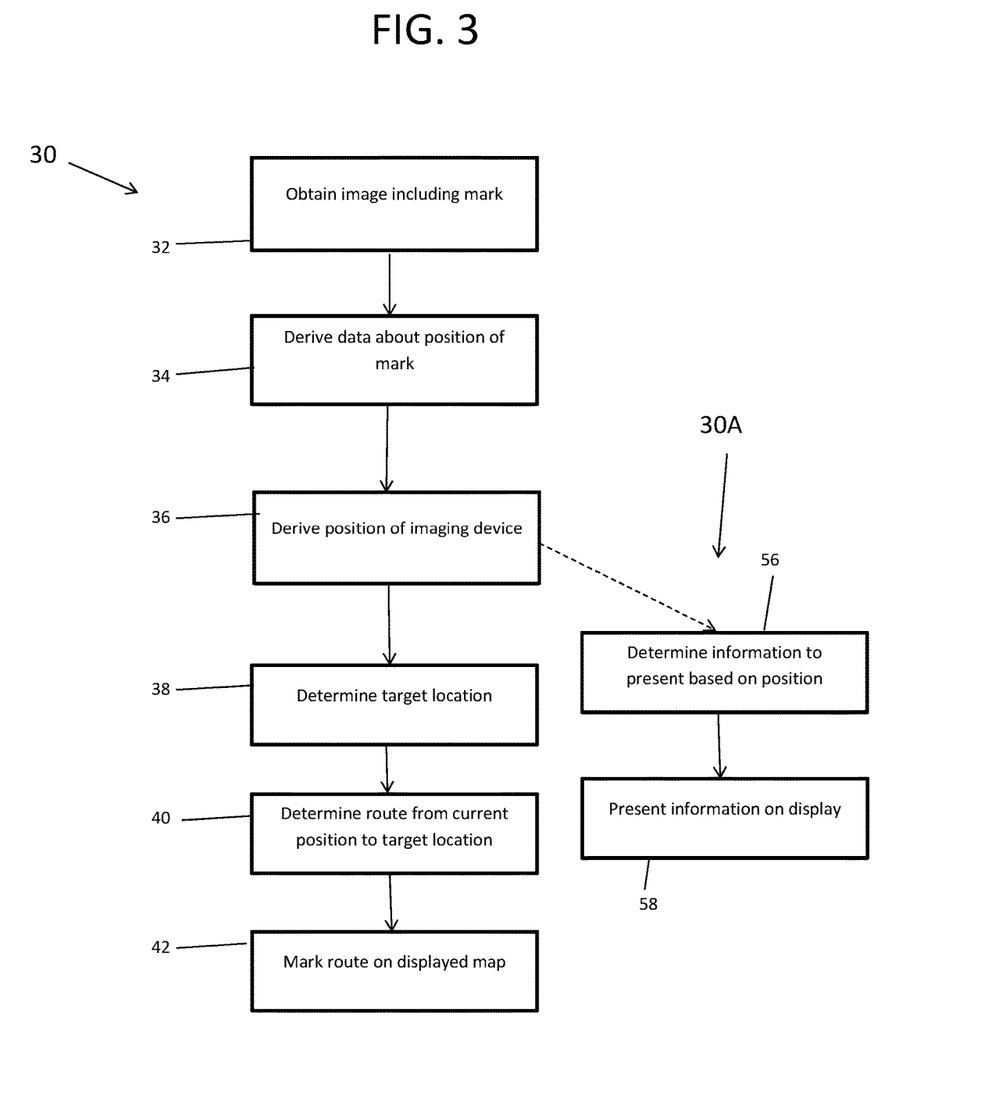
FIG. 3 is a flowchart of specific methods in accordance with the invention that apply the basis position determining method.

Once the position of the imaging device is known, there are numerous applications for this position. First, a method 30 for destination guiding using the imaging device is envisioned. This method may be applied to guide a person from their current location to a target location, e.g., the nearest coffee bar, department store, grocery store, gas station, etc., or to guide a vehicle to a destination.

As shown in FIG. 3, the method 30 includes a step 32 of obtaining an image of a mark on a known-position object from the imaging device, which mark has an encoded position as described above, and a step 34 of decoding the mark to derive data about the position of the mark, as described above. Further, the appearance of the mark in the image is analyzed in step 36 in combination with the derived data about the position of the mark to derive the position of the imaging device, as described above. Now, in this destination guiding method 30, a target location is determined in step 38, in response to receiving user input by means of a user interface 46 coupled to the mobile device 44 (see FIG. 4). The target location may be determined by input from the user about the type of store they are seeking, e.g., the nearest ethnic restaurant, an entertainment venue such as a movie theater, a residence, a business, etc. The user interface may be a keyboard input device, mouse, touchpad, touchscreen and/or voice recognition hardware and software.

The next step 40 is to determine a route between the position of the imaging device and the target location. There are many known techniques to determine a route. The selected route depends on the manner in which the person or vehicle will travel from the current position to the target location, e.g., on foot, bicycle, motorized vehicle, etc., as well as travel conditions. The invention may be used with any available route determination system using as input the current position and the target location, and the means to convey the route, e.g., display, speaker, and automatic guiding of a vehicle.

Figure 4:
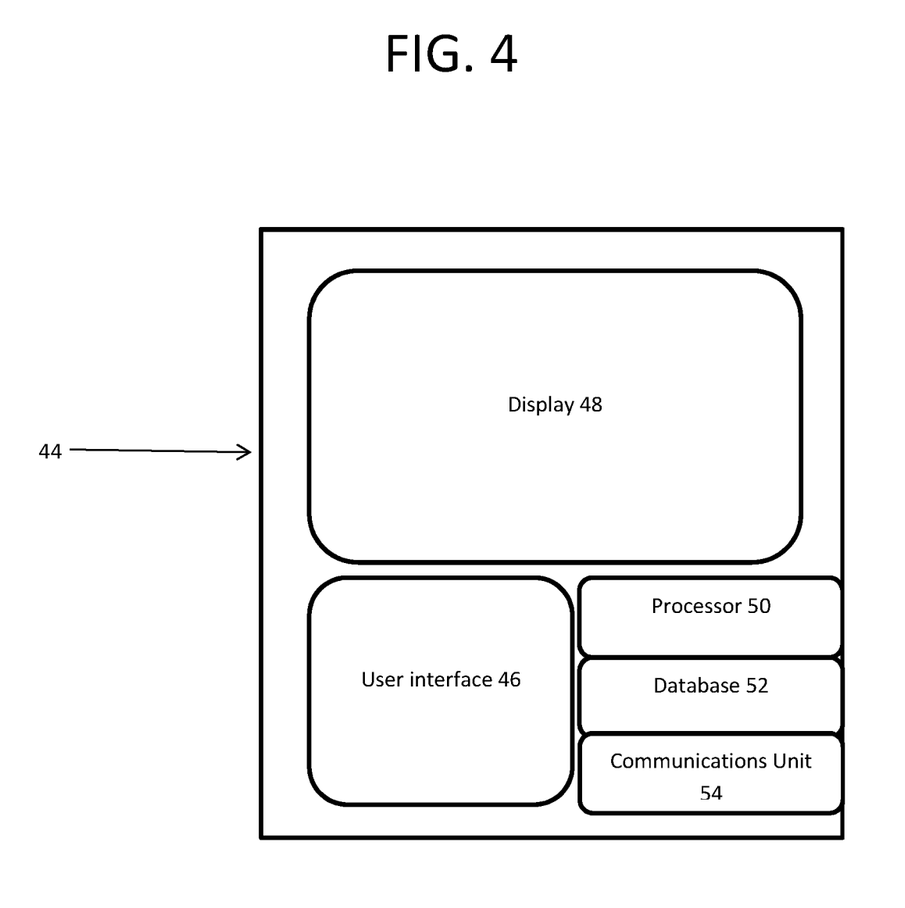
FIG. 4 is a schematic view of a smartphone that can apply the method in accordance with the invention.

For example, the determined route may be marked on a map and the map is displayed with the marked route, step 42. Display of the map with the marked route (step 42) is just one specific example of techniques to convey directions. There are other techniques to adjust and control the components of the mobile device 44 to convey directions, all of which are encompassed within the scope and spirit of the disclosure. For example, the mobile device 44 is typically equipped with a speaker and it is possible to orally convey directions via the speaker, either together with or independent of the display of the marked route on a display of the mobile device 44.

The destination guiding method 30 may be implemented on a smartphone 44, e.g., in the form of an "app". The smartphone 44 would include a user interface 46 and display 48, with the user interface 46 possibly being hardware and software to enable the display 48 to be a touch screen and allow for data entry by the user by touching the display 48. Thus, the user interface 46 and display 48 may be incorporated into a single component. Examples of other user interfaces are mentioned above. The smartphone 44 may also include a processor 50, a database 52 that contains data about marks and their position, and a communications unit 54 that can communicate with remote sites to enable functionality of the destination guiding method.

The processor 50 performs the functions of the process described above, e.g., executing a computer program resident on computer-readable media that may be on the smartphone 44 to determine when an image contains a mark having an encoded position, analyze the mark using the database 52 to obtain position data about the mark, and analyze the appearance of the mark in the image in combination with the position data about the mark to derive the position of the imaging device. The processor 50 then executes another computer routine or program resident on computer-readable media that may be on the smartphone 44 to consider the target location, determine a route to the target location, mark the route on a map, and display the marked route and map on the display 48. This latter stage may be achieved by the processor 50 using the communications unit 54 to obtain information about the target location. Turn-by-turn directions may be sequentially and timely provided based on the current position of the person or vehicle.

Figure 5:
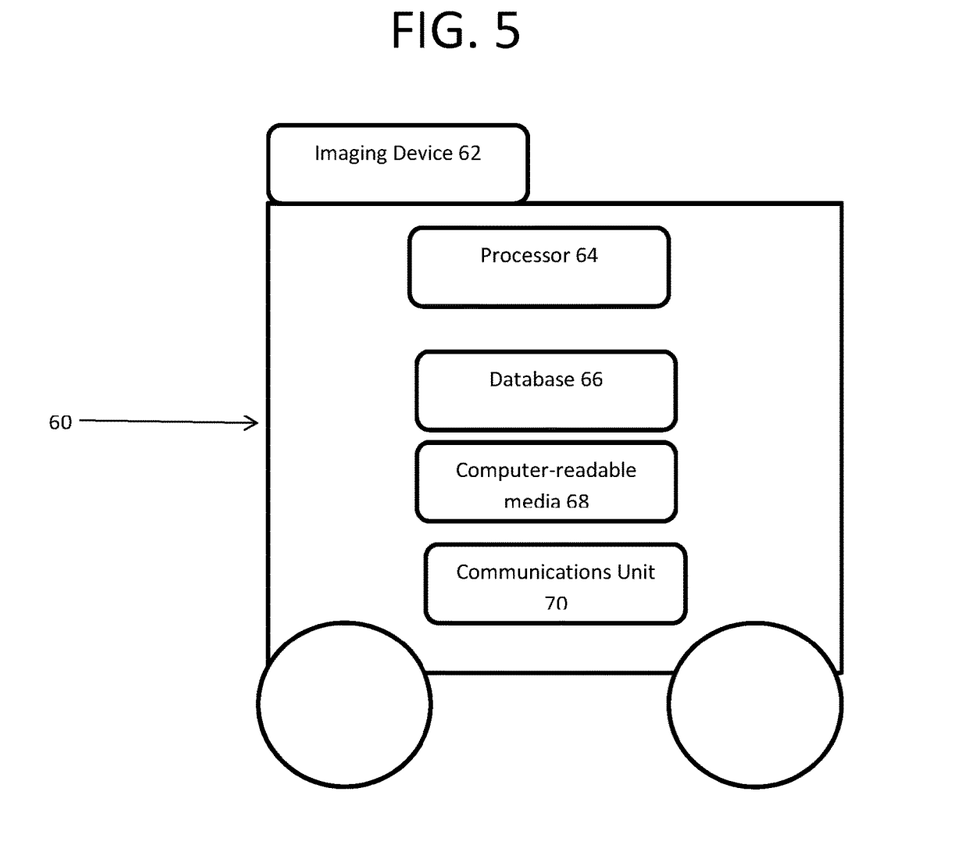
FIG. 5 is a schematic view of an automated guided vehicle that can apply the method in accordance with the invention.

Referring now to FIG. 5, this technique is also useful for AGVs and other vehicles. An AGV 60 may be a robot, a drone or even a remote controlled car. It is important for such AGVs to know their exact position to enable autopilot functionality in a path from an initial location to a target location. In one embodiment, a pre-programmed path for the vehicle from the initial location to the target location is provided in a known manner of programming AGVs, and the AGV 60 would ideally need to know its position every step of the way with a high precision, just like a manned vehicle needs its position in order to provide turn-by-turn directions. As long as the AGV 60 includes an imaging device 62 and one or more marks with position-encoded data is viewable to the imaging device 62, the AGV 60 can proceed by itself and self-corrects for possible deviations. It is possible to provide the AGV 60 with multiple imaging devices 60 to cover the environment all around its periphery to improve the likelihood of an image being obtained that includes a mark with encoded position.

Whenever a mark is determined to be within view of the imaging device 62 on the AGV 60, a processor 64 on the AGV 60 could analyze an image including the mark and calculate its present position using, e.g., a database 66 of marks and position data which is on the AGV or available to the AGV 60 through a communications unit 70 thereon. This position can be used to determine if the path being followed by the AGV 60 is the same as the programmed path from the initial location to the target location. When deviations occur, the processor 64 could use the current position and the target location to re-calculate a route to the target location.

A navigation system for an AGV is thus one of the applications of the position determining method described above. The navigation system could be operative the entire time the AGV is travelling from its initial location to the target location, continually seeking images with position-encoded marks for analysis to confirm the position of the AGV and that the AGV is on the correct, pre-programmed path. A computer program resident on computer-readable media 68 that may be on the AGV 60 would be executed by the processor 64 to compare the expected position, determined based on the pre-programmed route and travel time, and the current position determined based on the image analysis. This comparison forms the basis for possible path corrections that may be necessary to return the AGV 60 to the pre-programmed path if the AGV has deviated from the path, or provide a new path if the pre-programmed path is no longer the best option to travel from the current position to the target location.

Referring back to FIG. 3, another use of the position data about the imaging device may be used in a method 30A for selecting information for presentation on a mobile device including the imaging device. This method 30A includes the same steps 32, 34, 36 as method 30 and then in step 56, determines information to present, from among a plurality of different information items, based on the position of the imaging device. This step may be performed by the processor 50 which executes a computer program resident on computer-readable media that may be on the smartphone 44 to consider the current position of the smartphone 44 and determine available information in the form of, for example, advertisements, to present. These establishments may be those in the vicinity of the smartphone 44, e.g., coupons or sale notifications for stores and restaurants in the vicinity of the smartphone 44 may be selected. Advertising schemes to receive revenue from participating establishments whose advertisements are directed to smartphones in their vicinity is another use of the invention. There is thus a database of possible and available information items, advertisements or other informative items, and since not all of these can be presented at once, the selection of which informative item to present is position-dependent. The selection may also involve other factors, such as characteristics of the owner or user of the smartphone 44.

Finally, in step 58, the information is presented using an output device of the mobile device, e.g., on the display 48 of the smartphone 44.

In this regard, the invention may be considered as a novel technique to present advertisements to people using marks with position-encoded information. Simply by having an imaging device of a smartphone view such a mark and obtain an image including the mark, it is possible to tailor location-specific advertisements to the user of the smartphone. These advertisements are determined through derivation of the position of the smartphone via mark analysis techniques described above.

Figure 6:
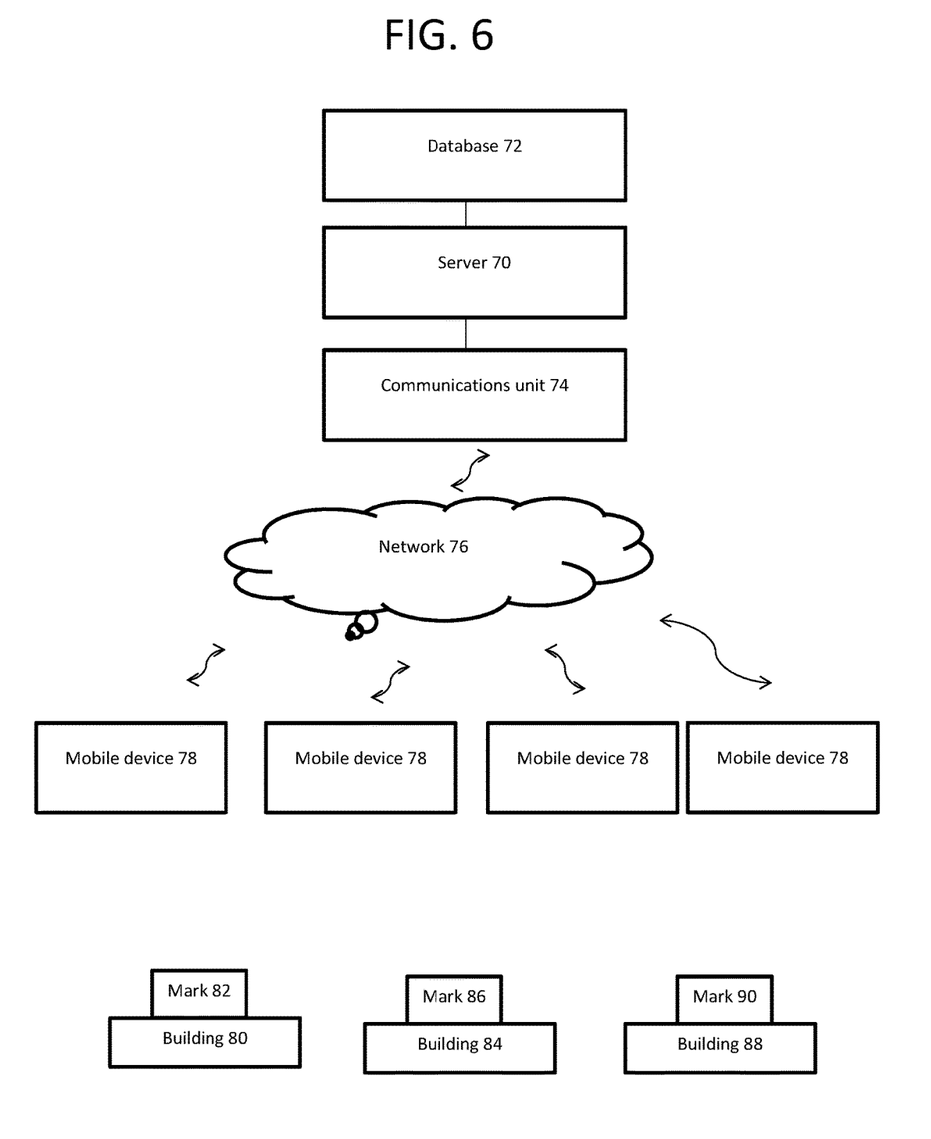
FIG. 6 is a schematic view of a server-based method for applying the method in accordance with the invention.

Referring now to FIG. 6, the invention also includes a method implemented at a server 70 to provide position data about mobile devices, wherein the position data is obtained as described above using analysis of marks, with or without encoded position data. The server 70 is coupled to a database 72 resident on at least one memory component accessible to the server 70 and contains data about a plurality of marks and the position of each mark.

The server 70 wirelessly receives from one or more of the mobile devices 78 via a communications unit 74 coupled to the server 70 and a network 76, an image of a mark 82, 86, 90 obtained from an imaging device of the mobile device 78. Each mark 82, 86, 90 is positioned on a different object, e.g., buildings 80, 84, 88, so that the position encoding of each mark is different and specific to the location of the buildings 80, 84, 88.

Upon receiving an image, or signals representative or derived from the image, the server 70 obtains the position of the mark as output from the database 72 upon inputting the mark in the received image. This may be achieved using a processor at the server 70 executing a computer program resident in computer-readable media, and designed to perform this functionality. The processor analyzes the appearance of the mark in the received image in combination with the position of the mark output from the database 72 to derive the position of the mobile device 78 that provided the image. A transmission is generated at the server 70 for the mobile device 78 that provided the image, and provided thereto via the communications unit 74 and network 76. This transmission causes a positional information providing system at the mobile device 78 to change data about position of the mobile device 78 being provided by the positional information providing system. The transmission may include the position of the imaging device or commands to change operation of the positional information providing system at the mobile device 78.

The positional information providing system at the mobile device 78 may be a display of the mobile device (e.g., display 48 of smartphone 44 shown in FIG. 4). If used to display a route, the server 70 would also receiving a target location from the mobile device 78 providing the image, and execute a computer program to determine a route between the position of the mobile device 78 providing the image and the received target location. The transmission would include the determined route to enable the determined route to be marked on a map displayed on the display of the mobile device 78, but may not actually include the position of the mobile device 78. Details about determining such as route are described above with reference to the method 30 explained with reference to FIG. 3.

If the position data is used to determine information to present based on the position of the mobile device 78, then the transmission would include the determined information to enable the determined information to be displayed on the display of the mobile device 78 providing the image. Again, it is not essential that the position of the mobile device 78 be provided to the mobile device 78, but rather, the position is used by the server 70 to generate a transmission with position-specific information to cause the positional information providing system to alter its operation in response to the received position-specific information.

The invention also includes a method for gathering information about mobile devices at the server. By receiving images from mobile devices, and providing position data thereto in response, the server is able to gather data about the position of the mobile devices. This data can be numerically processed and presented to an entity interested in the number of mobile devices in specific locations, or in the number of mobile devices passing by a specific mark. If a mark is known to be a landmark, it becomes possible to determine how many mobile device users viewed the landmark in specific time periods.

Disclosed above is the use of a mark generally having an encoded position so that by decoding the mark, data about the position of the mark is obtained.

In alternative embodiments, the position of the mark is not encoded in the mark itself, but rather the mark is not encoded and the position of the mark is stored in a database embodied in computer hardware components, e.g., memory components, and accessible by a processor executing a computer program (as described for the server-implemented method of FIG. 6). In this case, the mark may be any two-dimensional or three-dimensional object, whether designed specifically for the position-determining techniques or already existing. It is a considered a mark if its visualization is unique, i.e., it has a unique structure that is different than other structures so that when present in an image, that structure can only be associated with a single position.

To implement such a technique, the processor executes a computer program to convert the mark obtained by the imaging device, e.g., of a mobile device, into data about the position of the mark by accessing the database containing marks and associated position data. Once the processor is provided with the position of the mark, the processor can identify the position of the imaging device using the techniques disclosed above, e.g., compare the appearance of the mark from the current position of the imaging device to the appearance of the mark from a known position of an imaging device and analyze the comparison to identify the position of the imaging device relative to the mark and thus the absolute position of the imaging device when considered in conjunction with the position of the mark.

As an example of this position data obtaining technique, if a mobile device with an imaging device obtains an image including a landmark, such as the Empire State Building in New York City, as a preliminary step, the image would be analyzed to determine whether one of the marks in the mark/position database is present in the image. Assuming the Empire State Building is one of the marks in the mark/position database, then the processor would input the Empire State Building into the mark/position database and retrieve the position of the Empire State Building. Then, the processor would compare the appearance of the Empire State Building in the image obtained by the imaging device of the mobile device to the appearance of the Empire State Building in an image taken from a known position. Based on this comparison, and in combination with the obtained position of the Empire State Building, it is possible to mathematically determine the position of the imaging device of the mobile device, which is considered the position of the mobile device. Such mathematical calculations are readily determinable by those skilled in the art to which this invention pertains in view of the disclosure herein.

For this embodiment, the marks may be three-dimensional marks, and include known buildings, infrastructure, edifices and other objects having fixed positions. Determination of the position of the mark from the image including the mark and the appearance comparison may be performed entirely on the same device as the imaging device, entirely at a location remote and separate and apart from the imaging device, or partly in the same housing as the imaging device and partly at a location remote and separate and apart from the imaging device. These same possibilities are applicable to any of the other embodiments disclosed herein.

Non-transitory computer readable media includes, but unless inconsistent with the term is not limited to, any data storage device that can store data which can be thereafter read by a computer system. Examples of the non-transitory computer readable medium include ROM, RAM, CD-ROMs, magnetic tapes, floppy disks, and optical data storage devices. The non-transitory computer readable medium can also be distributed over network coupled computer systems so that the computer readable code is stored in one or more physical locations and executed in a distributed fashion. Also, functional programs, code, and code segments for accomplishing the present disclosure can be easily construed by programmers skilled in the art to which the invention pertains in view of the disclosure herein.

Disclosed embodiments sometimes involve processing of input data (about a mark) and the generation of output data (about position of the mark). Input data processing and output data generation may be implemented in hardware or software in combination with hardware. For example, specific electronic components may be employed in a mobile device or similar or related circuitry for implementing the functions associated with disclosed embodiments. Alternatively, one or more processors operating in accordance with instructions stored on non-transitory computer readable media may implement the functions associated with embodiments of the present invention. Examples of the processor readable mediums include ROM, RAM, CD-ROMs, magnetic tapes, floppy disks, and optical data storage devices. The processor readable mediums can also be distributed over network coupled computer systems so that the instructions are stored in one or more physical locations and executed in a distributed fashion. Also, functional computer programs, instructions, and instruction segments for accomplishing the invention can be construed by programmers skilled in the art to which the invention pertains in view of the disclosure herein.

The term "memory component", alternatively, memory media, is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in to different, spatially separated computers, one of which executes the programs while connected to the other computer over a network to receive program instructions therefrom for execution.

In general, the term "processor" may refer to any device having a processor or processing unit that executes instructions from one or more memory components. The memory component may store a software program or programs operable to implement any of the methods disclosed.

The software programs disclosed herein may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. Any of the processors disclosed herein may thus include a central processing unit (CPU) for executing code and data from the memory medium and may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A method for determining position of a mobile device having an imaging device, comprising:
   obtaining an image of a mark on a known-position object from the imaging device, the mark having an encoded position;
   decoding the mark, using a processor, to derive data about the position of the mark; and
   analyzing appearance of the mark in the image in combination with the derived data about the position of the mark, using the processor, to derive the position of the imaging device,
   the analyzing step comprising analyzing an angle between an imaging direction of the imaging device and a surface of the mark using the processor.

2. The method of claim 1, wherein the mark is a two-dimensional mark.

3. The method of claim 1, wherein the known-position object is an object fixed in position.

4. The method of claim 1, wherein the analyzing step is performed on the mobile device.

5. The method of claim 1, wherein the decoding step comprises accessing a database resident on at least one memory component and containing data about a plurality of marks and the position of each of the plurality of marks.

6. The method of claim 1, wherein the decoding step comprises:
   wirelessly transmitting the mark to a site remote from the mobile device, a database resident on at least one memory component and containing data about a plurality of marks and the position of each of the plurality of marks being accessed at the remote site to output the position of the mark wirelessly transmitted from the mobile device; and
   receiving at the mobile device from the remote site, the data about the position of the mark output from the database.

7. A method for destination guiding using an imaging device of a mobile device, comprising;
   obtaining an image of a mark on a known-position object from the imaging device, the mark having an encoded position;
   decoding the mark, using a processor, to derive data about the position of the mark;
   analyzing appearance of the mark in the image in combination with the derived data about the position of the mark, using the processor, to derive the position of the imaging device;
   determining a target location in response to receiving user input by means of a user interface coupled to the mobile device;
   determining, using the processor, a route between the position of the imaging device and the target location; and
   marking the route on a map and displaying the map with the marked route on the mobile device,
   the analyzing step comprising analyzing an angle between an imaging direction of the imaging device and a surface of the mark using the processor.

8. The method of claim 7, wherein the target location is a retail establishment, an entertainment venue, a residence or a business.

9. The method of claim 7, wherein the decoding step comprises accessing a database resident on at least one memory component and containing data about a plurality of marks and the position of each of the plurality of marks.

10. The method of claim 7, wherein the decoding step comprises:
    wirelessly transmitting the mark to a site remote from the mobile device, a database resident in at least one memory component and containing data about a plurality of marks and the position of each of the plurality of marks being accessed at the remote site to output the position of the mark wirelessly transmitted from the mobile device; and receiving at the imaging device from the remote site, the data about the position of the mark output from the database.

11. A method for selecting information for presentation on a mobile device including an imaging device, comprising;
   obtaining an image of a mark on a known-position object from the imaging device, the mark having an encoded position;
   decoding the mark, using a processor, to derive data about the position of the mark;
   analyzing appearance of the mark in the image in combination with the derived data about the position of the mark, using the processor, to derive the position of the imaging device;
   determining information to present, from among a plurality of different information items, based on the position of the imaging device; and
   presenting the information using an output device of the mobile device,
   the analyzing step comprising analyzing an angle between an imaging direction of the imaging device and a surface of the mark using the processor.

12. The method of claim 11, wherein the decoding step comprises accessing a database resident on at least one memory component and containing data about a plurality of marks and the position of each of the plurality of marks.

13. The method of claim 11, wherein the decoding step comprises:
   wirelessly transmitting the mark to a site remote from the mobile device, a database resident in at least one memory component and containing data about a plurality of marks and the position of each of the plurality of marks being accessed at the remote site to output the position of the mark wirelessly transmitted from the mobile device; and
   receiving at the imaging device from the remote site, the data about the position of the mark output from the database.

14. A method implemented at a server to provide position data about mobile devices, comprising:
   maintaining a database resident on at least one memory component accessible to the server and containing data about a plurality of marks and the position of each of the plurality of marks;
   wirelessly receiving at the server from a mobile device, an image including a mark obtained by an imaging device of the mobile device using a communications device at the server;
   accessing the database, using a processor at the server, to obtain the position of the mark as output from the database upon inputting the mark in the received image;
   analyzing appearance of the mark in the received image, using the processor, in combination with the position of the mark output from the database to derive position of the imaging device which is considered position of the mobile device; and
   generating a transmission to the mobile device to cause a positional information providing system to change data about position of the mobile device being provided by the positional information providing system.

15. The method of claim 14, further comprising wirelessly transmitting the position of the imaging device from the server to the mobile device.

16. The method of claim 14, wherein the positional information providing system is a display of the mobile device, further comprising:
   receiving a target location from the mobile device; and
   determining a route between the position of the mobile device and the received target location;
   the transmission generating step comprising generating a transmission including the determined route to enable the determined route to be marked on a map displayed on the display of the mobile device.

17. The method of claim 14, wherein the positional information providing system is a display of the mobile device, further comprising:
   determining information to present, from among a plurality of different information items, based on the position of the imaging device; and
   the transmission generating step comprising generating a transmission including the determined information to enable the determined information to be displayed on the display of the mobile device.

18. A method for determining position of a mobile device having an imaging device, comprising:
   obtaining an image of a mark on a known-position object from the imaging device, the mark having an encoded position;
   decoding the mark, using a processor, to derive data about the position of the mark; and
   analyzing appearance of the mark in the image in combination with the derived data about the position of the mark, using the processor, to derive the position of the imaging device,
   the decoding step comprising accessing a database resident on at least one memory component and containing data about a plurality of marks and the position of each of the plurality of marks.

19. A method for determining position of a mobile device having an imaging device, comprising:
   obtaining an image of a mark on a known-position object from the imaging device, the mark having an encoded position;
   decoding the mark, using a processor, to derive data about the position of the mark; and
   analyzing appearance of the mark in the image in combination with the derived data about the position of the mark, using the processor, to derive the position of the imaging device,
   the decoding step comprising:
   wirelessly transmitting the mark to a site remote from the mobile device, a database resident on at least one memory component and containing data about a plurality of marks and the position of each of the plurality of marks being accessed at the remote site to output the position of the mark wirelessly transmitted from the mobile device; and
   receiving at the mobile device from the remote site, the data about the position of the mark output from the database.

20. A method for destination guiding using an imaging device of a mobile device, comprising;
   obtaining an image of a mark on a known-position object from the imaging device, the mark having an encoded position;
   decoding the mark, using a processor, to derive data about the position of the mark;

analyzing appearance of the mark in the image in combination with the derived data about the position of the mark, using the processor, to derive the position of the imaging device;

determining a target location in response to receiving user input by means of a user interface coupled to the mobile device;

determining, using the processor, a route between the position of the imaging device and the target location; and marking the route on a map and displaying the map with the marked route on the mobile device, the decoding step comprises accessing a database resident on at least one memory component and containing data about a plurality of marks and the position of each of the plurality of marks.

21. A method for destination guiding using an imaging device, comprising;

obtaining an image of a mark on a known-position object from the imaging device, the mark having an encoded position;

decoding the mark, using a processor, to derive data about the position of the mark;

analyzing appearance of the mark in the image in combination with the derived data about the position of the mark, using the processor, to derive the position of the imaging device;

determining a target location in response to receiving user input by means of a user interface coupled to the mobile device;

determining, using the processor, a route between the position of the imaging device and the target location; and marking the route on a map and displaying the map with the marked route on the mobile device, the decoding step comprising:

wirelessly transmitting the mark to a site remote from the mobile device, a database resident in at least one memory component and containing data about a plurality of marks and the position of each of the plurality of marks being accessed at the remote site to output the position of the mark wirelessly transmitted from the mobile device; and receiving at the imaging device from the remote site, the data about the position of the mark output from the database.

22. A method for selecting information for presentation on a mobile device including an imaging device, comprising;

obtaining an image of a mark on a known-position object from the imaging device, the mark having an encoded position;

decoding the mark, using a processor, to derive data about the position of the mark;

analyzing appearance of the mark in the image in combination with the derived data about the position of the mark, using the processor, to derive the position of the imaging device;

determining information to present, from among a plurality of different information items, based on the position of the imaging device; and presenting the information using an output device of the mobile device, the decoding step comprising accessing a database resident on at least one memory component and containing data about a plurality of marks and the position of each of the plurality of marks.

23. A method for selecting information for presentation on a mobile device including an imaging device, comprising;

obtaining an image of a mark on a known-position object from the imaging device, the mark having an encoded position;

decoding the mark, using a processor, to derive data about the position of the mark;

analyzing appearance of the mark in the image in combination with the derived data about the position of the mark, using the processor, to derive the position of the imaging device;

determining information to present, from among a plurality of different information items, based on the position of the imaging device; and presenting the information using an output device of the mobile device, the decoding step comprising:

wirelessly transmitting the mark to a site remote from the mobile device, a database resident in at least one memory component and containing data about a plurality of marks and the position of each of the plurality of marks being accessed at the remote site to output the position of the mark wirelessly transmitted from the mobile device; and receiving at the imaging device from the remote site, the data about the position of the mark output from the database.

* * * * *